(12) United States Patent
Kawasato et al.

(10) Patent No.: US 6,902,791 B2
(45) Date of Patent: Jun. 7, 2005

(54) OPTICAL FILM

(75) Inventors: Fumiko Kawasato, Ichihara (JP); Takeomi Miyako, Ichihara (JP); Hirotoshi Terui, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 141 days.

(21) Appl. No.: 10/176,604

(22) Filed: Jun. 24, 2002

(65) Prior Publication Data

US 2003/0049456 A1 Mar. 13, 2003

(30) Foreign Application Priority Data

Jun. 25, 2001 (JP) ........................................ 2001-191633

(51) Int. Cl.[7] .................. B32B 3/26; B32B 27/20; B32B 31/04; F21V 9/06; G02B 5/22
(52) U.S. Cl. .................... 428/141; 428/411.1; 428/421; 359/361; 359/885; 156/324
(58) Field of Search ................................ 428/141, 421, 428/423.1, 411.1; 359/361, 580, 885; 156/324

(56) References Cited

U.S. PATENT DOCUMENTS

| | | | |
|---|---|---|---|
| 5,449,558 A | 9/1995 | Hasegawa et al. | 428/422 |
| 5,834,122 A | 11/1998 | Teng et al. | 428/412 |
| 6,165,546 A | 12/2000 | Teng et al. | 427/163.1 |
| 6,229,252 B1 | 5/2001 | Teng et al. | 313/112 |
| 6,255,031 B1 * | 7/2001 | Yao et al. | 430/270.1 |
| 6,344,710 B2 | 2/2002 | Teng et al. | 313/479 |
| 6,452,331 B1 | 9/2002 | Sakurada et al. | 313/582 |

FOREIGN PATENT DOCUMENTS

| | | |
|---|---|---|
| EP | 0 894 620 | 2/1999 |
| EP | 1 069 088 | 1/2001 |
| EP | 1 087 243 | 3/2001 |
| EP | 1 111 410 | 6/2001 |
| JP | 4-160037 | 6/1992 |
| JP | 5-42622 | 2/1993 |
| JP | 10-219006 | 8/1998 |
| JP | 11-295506 | 10/1999 |
| JP | 2001-13317 | 1/2001 |

* cited by examiner

*Primary Examiner*—Ramsey Zacharia
(74) *Attorney, Agent, or Firm*—Oblon, Spivak, McClelland, Maier & Neustadt, P.C.

(57) ABSTRACT

An optical film which comprises a color tone correcting layer (A) containing as the main component a thermoplastic resin which is soluble in a solvent and which has a glass transition temperature of from 120 to 180° C., and containing a colorant which has a color tone correcting property, and a transparent resin layer (B) having a self-healing property and an ultraviolet ray absorption property, present on the viewer's side of the color tone correcting layer (A).

27 Claims, 1 Drawing Sheet

OPTICAL FILM

The present invention relates to an optical film excellent in durability and having a color tone correcting property.

In recent years, it has been required to impart an infrared ray absorption property to a transparent substrate made of e.g. glass, a polycarbonate resin or an acrylic resin, for shielding infrared rays as heat radiation to impart heat insulating and thermal insulating properties or for use as a noise protection filter for an electronic equipment.

Heretofore, as a method for imparting an infrared ray absorption property to a transparent substrate, (1) a method of mixing and blending an infrared ray absorbent with the transparent substrate itself, and (2) a method of directly forming an infrared ray absorptive thin film on the surface of the transparent substrate by a gas phase film formation method such as sputtering, have been proposed. In the method (1), a high processing temperature is required when the infrared ray absorbent is mixed, whereby the type of the infrared ray absorbent to be used is significantly limited. In the method (2), a large initial investment is required, such being unsuitable for multiproduct production, and humidity resistance, chemical resistance, durability, etc. may be insufficient depending upon the type of the thin film.

To overcome such problems, various methods of coating or laminating a resin layer having an infrared ray absorbent dissolved therein on a transparent substrate have been proposed (JP-A-4-160037, JP-A-5-42622). However, in these prior arts, the resin layer may plasticize with addition of a large amount of an infrared ray absorbent, whereby scratch resistance tends to be insufficient.

To overcome the above problems, the present inventors have invented a film of a polyurethane resin having a self-healing property and scratch resistance, which contains an infrared ray absorbent, and a film comprising a layer of such a polyurethane resin and a synthetic resin layer containing an infrared ray absorbent laminated, and have filed a patent application (JP-A-10-219006).

Further, as a film for near infrared ray shielding and for antireflection in a plasma display panel (PDP), JP-A-11-295506 discloses a near infrared ray shielding reflection-reducing material having an antireflection layer formed thereon, the antireflection layer formed by coating the surface of a near infrared ray shielding substrate with a coating liquid of a fluorine-containing polyfunctional (meth) acrylate, followed by curing, for example. Further, JP-A-2001-13317 discloses a filter for an image display device, which comprises a transparent support, and a selective absorption filter layer containing a colorant and a polymer binder, an antireflection layer and a tackifier layer formed on the support.

However, the above prior arts have problems as follows.

With the film as disclosed in JP-A-10-219006, when an infrared ray absorbent is incorporated in the polyurethane resin layer, no adequate heat resistance and durability of the infrared ray absorbent can be obtained, and the infrared ray shielding property tends to deteriorate with time.

In a case where an infrared ray absorbent is incorporated in the synthetic resin layer other than the polyurethane resin layer, the infrared ray absorbent is likely to deteriorate with time, whereby the transmittance of light in the visible light region may change, and the transmittance of near infrared rays tends to increase as well.

Each of the films as disclosed in JP-A-11-295506 and JP-A-2001-13317, comprises a thin antireflection layer formed on a hard coat layer made of polyethylene terephthalate (PET), whereby the antireflection layer as the outermost layer is likely to be scratched.

Further, with regard to the layer containing an infrared ray absorbent, the film as disclosed in JP-A-11-295506 has a near infrared ray shielding layer formed by coating the film with a coating liquid having a near infrared ray absorbing colorant mixed with an ultraviolet curing resin, followed by irradiation with ultraviolet rays for curing. The near infrared ray absorbing colorant tends to deteriorate due to the irradiation with ultraviolet rays.

Under these circumstances, the present invention has been made to provide an optical film having a color tone correcting property, an infrared ray absorption property, a self-healing property and scratch resistance, excellent in durability and weather resistance.

To achieve the above object, the present inventors have conducted extensive studies and as a result, have found that deterioration of a colorant having a color tone correcting property and a near infrared ray absorption property can be prevented by laminating a color tone correcting layer containing as the main component a thermoplastic resin which is soluble in a solvent and which has a glass transition temperature of from 120 to 180° C., and containing a colorant which has a color tone correcting property, or a color tone correcting layer containing a colorant which has a color tone correcting property and a colorant which has a near infrared ray absorption property, and a transparent resin layer having a self-healing property and an ultraviolet ray absorption property on the viewer's side of the color tone correcting layer. The present invention has been accomplished on the basis of this discovery.

Namely, the present invention provides an optical film which comprises a color tone correcting layer (A) containing as the main component a thermoplastic resin which is soluble in a solvent and which has a glass transition temperature of from 120 to 180° C., and containing a colorant which has a color tone correcting property, and a transparent resin layer (B) made of a material having a self-healing property and an ultraviolet absorption property, present on the viewer's side of the color tone correcting layer (A).

In the optical film of the present invention, the color tone correcting layer (A) may further contain a colorant which has a near infrared ray absorption property. Further, fine irregularities may be formed on the viewer's side surface of the transparent resin layer (B).

Further, a preferred construction is such that an antireflection layer (C) is present on the viewer's side of the transparent resin layer (B), and an interlayer having a refractive index higher than that of the transparent resin layer (B) may be present between the transparent resin layer (B) and the antireflection layer (C).

Figure 1:
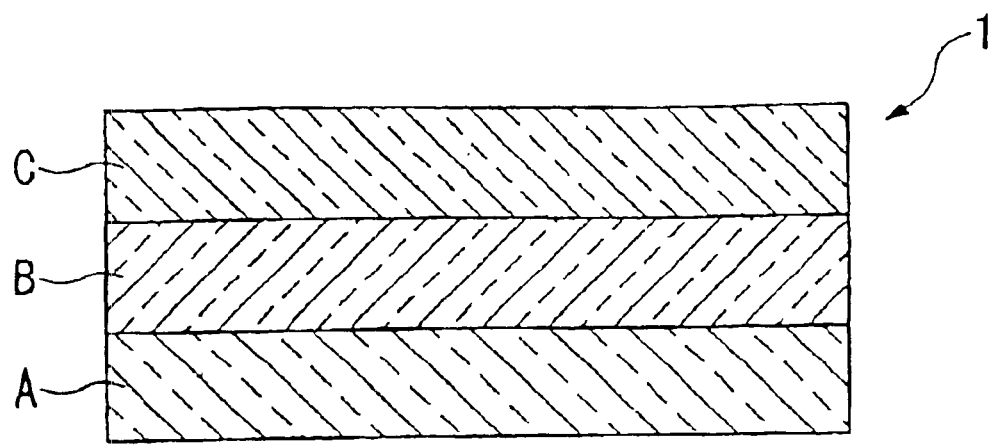
FIG. 1 is a longitudinal section illustrating a substantial part of one example of the optical film of the present invention.

The optical film 1 comprises a color tone correcting layer A containing as the main component a thermoplastic resin which is soluble in a solvent and which has a glass transition temperature of from 120 to 180° C., and having a colorant which has a color tone correcting property added to the main component, a transparent resin layer B having a self-heating property and an ultraviolet ray absorption property, provided on the color tone correcting layer A, and an antireflection layer C provided on the transparent resin layer B.

Now, the present invention will be described in detail with reference to the preferred embodiments.

Color Tone Correcting Layer

The main component in the color tone correcting layer A is suitably selected from thermoplastic resins which are soluble in a solvent and which have a glass transition temperature (hereinafter referred to as Tg) of from 120 to 180° C., preferably from 130 to 150° C. A preferred thermoplastic resin may, for example, be a polyester type resin, an olefin type resin, a cycloolefin type resin or a polycarbonate resin. As the resin for the main component, a commercially available product such as a polyester resin "O-PET", tradename, manufactured by Kanebo Ltd.; a polyolefin resin "ARTON", tradename, manufactured by JSR Corporation; a cycloolefin resin "ZEONEX", tradename, manufactured by ZEON Corporation; or "Iupilon", tradename, manufactured by Mitsubishi Engineering-Plastics Corporation, may be used.

If Tg of the thermoplastic resin as the main component of the color tone correcting layer A is less than 120° C., durability and weather resistance of the colorant to be mixed therewith tend to be insufficient, the colorant tends to deteriorate with time, or in a short period of time particularly under conditions of high temperature and high humidity, whereby the near infrared ray absorption property of the color tone correcting layer A tends to decrease, and the transmittance of visible light tends to change as well. On the other hand, a thermoplastic resin having a Tg exceeding 180° C. tends to have a poor solubility in a solvent, whereby preparation of the optical film 1 of the present invention tends to be difficult.

The solvent in which the resin as the main component is dissolved may, for example, be a ketone type solvent such as cyclohexanone, an ether type solvent, an ester type solvent such as butyl acetate, an ether alcohol type solvent such as ethyl cellosolve, a ketone alcohol type solvent such as diacetone alcohol or an aromatic solvent such as toluene. They may be used alone or as a mixed solvent system comprising at least two types mixed.

In the color tone correcting layer A, a colorant which has a color tone correcting property is contained. The colorant may be either a dye or a pigment. Here, in the present invention, "a colorant which has a color tone correcting property (hereinafter referred to as a color tone correcting agent)" is a colorant capable of specifically absorbing light in the wavelength region of a visible light (wavelength: 380–780 nm), preferably light in a specific wavelength region (or regions). Further, in the color tone correcting layer A, a colorant which has a near infrared ray absorption property may be contained. The colorant may be either a dye or a pigment. Here, in the present invention, "a colorant which has a near infrared ray absorption property (hereinafter referred to as a near infrared ray absorbent)" may be any colorant capable of absorbing part of light in the near infrared region (wavelength: 780–1,300 nm), and a colorant having an absorption power in other wavelength regions, such as a colorant having a visible light absorption power, may also be used.

The color tone correcting agent is used to absorb part of a visible light in a specific wavelength region depending upon the purpose of use of the optical film 1, to improve the color tone of the transmitted visible light. The color tone correcting agent to be used in the present invention may be a known organic pigment, organic dye or inorganic pigment of azo type, condensed azo type, diimmonium type, phthalocyanine type, anthraquinone type, indigo type, perinone type, perylene type, dioxazine type, quinacridon type, methine type, isoindolinone type, quinophthalone type, pyrrole type, thioindigo type or metal complex type. Preferred is a colorant having favorable weather resistance and having favorable compatibility or dispersibility with the main component in the color tone correcting layer A, such as a diimmonium type, phthalocyanine type or anthraquinone type colorant, and they may be used alone or in combination as a mixture of at least two.

The near infrared ray absorbent to be used in the present invention may, for example, be a polymethine type, phthalocyanine type, naphthalocyanine type, metal complex type, aminium type, immonium type, diimmonium type, anthraquinone type, dithiol metal complex type, naphthoquinone type, indolephenol type, azo type or triallylmethane type compound, but is not limited thereto. For the purpose of absorbing heat radiation and preventing noises of an electronic equipment, preferred is a near infrared ray absorbent having a maximum absorption wavelength of from 750 to 1,100 nm, and particularly preferred is a metal complex type, aminium type, phthalocyanine type, naphthalocyanine type or diimonium type compound. The near infrared ray absorbent may be used alone or as a mixture of at least two types thereof.

When the optical film of the present invention is applied to an image display device, particularly as an antireflection/color tone correcting film material for a plasma display panel (hereinafter referred to PDP), to the color tone correcting layer A, one type or plural types of color tone correcting agents are preferably mixed and incorporated so as to selectively absorb and decay extra luminescent color (mainly in a wavelength region of from 560 to 610 nm) from a discharge gas sealed in the main body of PDP, such as a two-component gas comprising neon and xenon. By such a colorant construction, of visible light emitted from PDP, extra light resulting from light emission of a discharge gas is absorbed in and decayed by the color tone correcting layer A, and as a result, a display color of visible light emitted from PDP can be made close to the aimed display color, whereby a PDP device capable of displaying natural color tones can be provided. Some of colorants which selectively absorb and decay extra luminescent color from a discharge gas have an effect to absorb and decay near infrared rays. When a near infrared ray absorbent is contained in the color tone correcting layer A, near infrared rays emitted from PDP are absorbed in the color tone correcting layer A, whereby noise against an electronic equipment can be prevented.

The color tone correcting agent is contained in the color tone correcting layer A in an amount of preferably at least 0.1 mass %, particularly preferably at least 1 mass %, based on the thermoplastic resin as the main component in the color tone correcting layer so as to obtain a color tone correction effect. Further, the amount of the near infrared ray absorbent is preferably at least 0.1 mass %, particularly preferably at least 2 mass %, based on the thermoplastic resin as the main component in the color tone correcting layer A. Further, in order to maintain physical properties of the thermoplastic resin as the main component, the amount of the color tone correcting agent or the total amount of the color tone correcting agent and the near infrared ray absorbent is preferably suppressed to at most 10 mass %.

The thickness of the color tone correcting layer A is preferably at least 0.5 μm so as to obtain an adequate color tone correcting property or to obtain a color tone correcting property and a near infrared ray absorption property, and it is preferably at most 20 μm, whereby the solvent at the time of film formation is less likely to remain, and operation in the film formation tends to be easy. It is particularly preferably from 1 to 10 μm.

The method of forming the color tone correcting layer A is not particularly limited. For example, a substrate is coated with a coating liquid obtained by dissolving the main component and the colorant in a solvent, followed by drying, whereby a color tone correcting layer A in a desired thickness can be formed. As the coating method, dip coating, roll coating, spray coating, gravure coating, comma coating or die coating may, for example, be selected. By these coating methods, continuous processing is possible, whereby the productivity is excellent as compared with e.g. a vapor deposition method of batch type. Spin coating by which a thin uniform coating film can be formed can also be employed.

Transparent Resin Layer

The transparent resin layer B in the present invention may be formed by a transparent resin having a self-healing property such as a polyurethane resin. Such a polyurethane resin is known (JP-A-60-222249, JP-A-61-281118). In the present invention, for the transparent resin layer B, either a thermoplastic polyurethane resin or a thermosetting polyurethane resin may be used.

In the present invention, having a self-healing property means that "a value of the maximum load measured by a HEIDON scratch tester, with which scratches formed by using as a scratcher a diamond chip having a tip diameter of 15 $\mu$m at 23° C. in a relative humidity of 50%, can disappear (hereinafter referred to as a self-healing degree)" is at least 10 g. The self-healing degree of the transparent resin layer B in the present invention is more preferably at least 30 g.

A thermosetting polyurethane resin is a polyurethane resin obtained by using a tri- or higher functional compound as at least part of at least one of main reactive raw materials i.e. a polyfunctional active hydrogen compound (a polyol) and a polyisocyanate. Whereas, a thermoplastic polyurethane resin is a polyurethane resin obtained by using difunctional materials alone. The material of the transparent resin layer B in the present invention is particularly preferably a thermosetting polyurethane resin in view of chemical resistance, stain resistance, durability, etc.

Now, the thermosetting polyurethane resin will be explained below.

As the polyfunctional active hydrogen compound as a material for the thermosetting polyurethane resin, preferred is a polyol, and a polyether type polyol, a polyester type polyol or a polycarbonate type polyol may, for example, be used. Among them, preferred is a polyester type polyol in view of balance among durability, price, strength and scratch resistance, and self-healing property. Particularly preferred is a polyester type polyol obtained by ring opening of a cyclic ester, particularly caprolacton. The number of functional groups in the polyol is required to be larger than 1 on the average, but is preferably from 2 to 3 in view of balance among the strength, elongation, self-healing property and scratch resistance.

The polyol is preferably a triol alone (a single triol or a triol mixture of at least two types) or a mixture of a triol with a diol. The hydroxyl value of each polyol is not particularly limited, but the average hydroxyl value of all polyols is preferably from 100 to 600, more preferably from 200 to 500. The polyol may contain a chain extender which is a short chain polyol, and the average hydroxyl value is an average hydroxyl value calculated including it.

The chain extender to be used may, for example, be a short-chain diol, a short-chain polyol, a short-chain diamine or a short-chain polyamine. Particularly, in view of transparency, flexibility and reactivity, a short-chain diol and a short-chain polyol are preferred, and a short-chain diol is particularly preferred.

As the polyisocyanate, a known isocyanate for production of a polyurethane resin, such as an aromatic diisocyanate, an aromatic polyisocyanate, an aliphatic diisocyanate, an aliphatic polyisocyanate, an alicyclic diisocyanate or an alicyclic polyisocyanate, may be used, but preferred is a non-yellowing polyisocyanate, whereby yellowing of the polyurethane resin to be obtained can be suppressed. The non-yellowing polyisocyanate is a non-aromatic or aromatic polyisocyanate having no isocyanate group directly bonded to an aromatic nucleus. Particularly preferred is an aliphatic or alicyclic diisocyanate, a tri- or higher functional polyisocyanate, or a mixture of an alicyclic diisocyanate with a tri- or higher functional polyisocyanate.

The diisocyanate may, for example, be hexamethylene diisocyanate, isophorone diisocyanate or hydrogenated diphenylmethane diisocyanate. The tri- or higher functional polyisocyanate may, for example, be an isocyanurate modified product, a biuret modified product or a urethane modified product obtained by modification with a trivalent alcohol such as trimethylolpropane, of diisocyanate.

These materials may be used alone or as mixed. Further, a stabilizer such as an ultraviolet ray absorbent, an antioxidant or a light stabilizer, or an additive such as a catalyst promoting urethane formation reaction, an extender, a coloring agent, a flame retardant, an antistatic agent, a surfactant or a silane coupling agent, may be added. The ultraviolet ray absorbent may, for example, be a benzophenone type ultraviolet ray absorbent such as 2-hydroxy-4-methoxybenzophenone or 2-hydroxy-4-n-octyloxybenzophenone, a benzotriazole type ultraviolet ray absorbent such as 2-(2'-hydroxy-5'-methylphenyl)benzotriazole or 2-(2'-hydroxy-3'-tert-butyl-5'-methylphenyl)-5-chlorobenzotriazole, or another ultraviolet ray absorbent such as 2,4-di-tert-butylphenyl-3,5-di-tert-butyl-4-hydroxybenzoate, 4-tert-butylphenylsalicylate or ethyl-2-cyano-3,3-diphenylacrylate. These additives may be added to one or both of the polyol component and the polyisocyanate component. In a case where the material of the transparent resin layer B itself has a ultraviolet ray absorption property, the ultraviolet ray absorbent may be omitted. The addition amount of the ultraviolet ray absorbent and other additives is preferably from 0.1 to 5.0 parts by mass, preferably from 0.1 to 1.0 part by mass, per 100 parts by mass of the polyurethane resin as the main component of the transparent resin layer B.

As the method of forming a film of the polyurethane resin, extrusion molding, injection molding, blow molding, cast molding or calender molding may, for example, be mentioned. However, the film is most preferably obtained by reactive casting as disclosed in JP-A-1-56717, in view of optical quality of the film and such a view that the method can be applied also to a thermosetting polyurethane resin and the heating temperature at the time of forming is low.

The reactive casting is such a method that the fluid reactive material mixture to be a flexible synthetic resin by a reaction is reacted while it is casted on a carrier with releasing or non-releasing smooth surface to form a flexible synthetic resin film, which is separated from the carrier in the case of a carrier with releasing surface, to form a film. Usually, in a case where the reactive casting is carried out, the reactive material may contain a solvent, but more preferred is a method of using a reactive material containing substantially no solvent, i.e. reactive bulk casting, for production of a film of the transparent resin layer B.

The thickness of the transparent resin layer B is from 30 to 400 $\mu$m, preferably from 50 to 300 $\mu$m, more preferably from 100 to 300 $\mu$m. If the thickness of the transparent resin layer B having a self-healing property is less than 30 $\mu$m, no excellent self-healing property and scratch resistance tend to be obtained, whereby permanent scratches may easily be formed on the optical film 1, thus causing a practical problem. On the other hand, if it exceeds 400 $\mu$m, processability tends to be poor, and further, when the optical film 1 is applied to a touch panel, operation property at the time of pen-inputting tends to be poor.

An antiglare treatment may be carried out wherein fine irregularities are formed on the surface of the transparent resin layer B, and an antireflection layer C is formed on the surface having the fine irregularities formed thereon. By such an antiglare treatment, glare on the surface of the optical film 1 is significantly decreased, whereby antireflection property can be improved. Suitable conditions of the antiglare treatment are shown below.

The roughness of the fine irregularities is such a roughness that a gloss value is from 30 to 150 as represented by a 60° glossmeter.

The translucency is at least 80% as represented by a visible light transmittance (the average value of transmittances at wavelengths of from 380 to 780 nm as measured in accordance with JIS K6714).

The haze value is from 3 to 15% as measured in accordance with JIS K7105.

The reflectance of light rays on one side is at most 2% as calculated in accordance with JIS Z8701.

Antireflection Layer

The antireflection layer C is made of a material having a refractive index lower than that of the resin of the transparent resin layer B (preferably a refractive index of at most 1.36). Such a material is preferably a non-crystalline fluoropolymer. No antireflection layer C may be provided in a case of an application in which product cost reduction is strongly required, or in a case where at least surface part is constituted by a material having a low refractive index, or an antireflection function is imparted to the transparent resin layer B by carrying out an antireflection treatment such as an antiglare treatment to form fine irregularities on the surface to decrease the reflectance.

The non-crystalline fluoropolymer is excellent in transparency since it is free from light scattering by crystals. Such a non-crystalline fluoropolymer may, for example, be 1) a fluoroolefin type copolymer such as a terpolymer comprising tetrafluoroethylene, vinylidene fluoride and hexafluoropropylene respectively in an amount of from 37 to 48 mass %, from 15 to 35 mass % and from 26 to 44 mass % as a monomer unit, or 2) a polymer having a fluorine-containing alicyclic structure. Among them, preferred is a polymer having a fluorine-containing alicyclic structure, and particularly preferred is a polymer having a fluorine-containing alicyclic structure on its main chain, which is excellent in mechanical properties such as creep resistance. The number average molecular weight of the non-crystalline fluoropolymer is preferably from 50,000 to 1,000,000, more preferably from 50,000 to 500,000, particularly preferably from 50,000 to 100,000.

A polymer having a fluorine-containing alicyclic structure on its main chain, which is obtained by polymerizing a monomer having a fluorine-containing cyclic structure, is known from e.g. JP-B-63-18964. Namely, such a polymer may be obtained by homopolymerizing a monomer having a fluorine-containing alicyclic structure such as perfluoro(2, 2-dimethyl-1,3-dioxol), or by copolymerizing said monomer with a radical polymerizable monomer such as tetrafluoroethylene.

Further, a polymer having a fluorine-containing alicyclic structure on its main chain, which is obtained by cyclic polymerization of a fluorine-containing monomer having at least two polymerizable double bonds, is known from e.g. JP-A-63-238111 and JP-A-63-238115. Namely, a polymer obtained by cyclic polymerization of a fluorine-containing monomer having at least two polymerizable double bonds such as perfluoro(allyl vinyl ether) or perfluoro(butenyl vinyl ether), or a copolymer of such a monomer with a radical polymerizable monomer such as tetrafluoroethylene, may be mentioned.

Further, the polymer having a fluorine-containing alicyclic structure on its main chain may be a polymer obtained by copolymerizing a monomer having a fluorine-containing alicyclic structure such as perfluoro(2,2-dimethyl-1,3-dioxol) with a fluorine-containing monomer having at least two polymerizable double bonds such as perfluoro(allyl vinyl ether) or perfluoro(butenyl vinyl ether).

As the polymer having a fluorine-containing alicyclic structure, a polymer having a fluorine-containing alicyclic structure on its main chain is suitable, and preferred is one containing at least 20 mol % of monomer units having a fluorine-containing alicyclic structure in the monomer units constituting the polymer, from the viewpoint of transparency and mechanical properties. As other non-crystalline fluoropolymers, perfluoropolyethers of the following formulae 1 and 2 having reactive groups at both terminals and having a number average molecular weight of from 500 to 100,000, preferably from 1,000 to 10,000, may be mentioned. Particularly preferred as the reactive groups, are isocyanate groups which will provide excellent adhesiveness to the polyurethane resin layer.

$$X-CF_2-[(OCFR_1CF_2)_p-(OCF_2CF_2)_q-(OCF_2)_r]_m-CF_2-X \qquad \text{Formula 1:}$$

wherein X is an organic group containing an isocyanate group, a hydroxyl group, an amino group, an epoxy group, an acrylate group, a methacrylate group, a cyanamide group or a maleimide group, $R_1$ is F or $CF_3$, and each of p, q, r and m is an integer.

$$HOCH_2Y-[(OCFR_2CF_2)_s-(OCF_2CF_2)_t-(OCF_2)_u]_n-Y-CH_2OH \qquad \text{Formula 2:}$$

wherein Y is a perfluoroaliphatic group, $R_2$ is F or $CF_3$, and each of s, t, u and n is an integer.

Further, the polymer having a fluorine-containing alicyclic structure on its main chain may be commercially available as CYTOP (trade name) manufactured by Asahi Glass Company, Limited, and any known fluoropolymer may be used in the present invention. The polymer having a fluorine-containing alicyclic structure is preferably one having on its terminal a reactive group which may undergo chemical bonding or anchor bonding with a material for a layer under the antireflection layer C. Such a reactive group may, for example, be a hydroxyl group, a carboxylic acid group, an amino group, an epoxy group, an acryloyl group, a methacryloyl group, an isocyanate group, a cyano group, a carbamoyl group, a mercapto group or a vinyl group. Here, in the present invention, in order to increase the adhesion between the transparent resin layer B and the antireflection layer C, 1) an adhesive layer may be provided between the above layers, or 2) an additive for strengthening adhesion may be added to the antireflection layer C. With respect to the above item 1), the thickness of the adhesive layer is preferably from 1 to 50 nm so as not to deteriate the optical properties of the optical film 1 of the present invention, and with respect to the above item 2), the amount of the additive is preferably at most 50 parts by mass per 100 parts by mass of the non-crystalline fluoropolymer which forms the antireflection layer, from the same reason as mentioned above. As a material constituting the adhesive layer or additive, the following alkoxysilanes may be mentioned, and they may be used alone or in combination as a mixture of two or more of them:

Monoalkoxysilanes such as vinyltriethoxysilane, trimethylmethoxysilane, trimethylethoxysilane, dimethylvinylmethoxysilane and dimethylvinylethoxysilane; dialkoxysilanes such as γ-chloropropylmethyldimethoxysilane, γ-chloropropylmethyldiethoxysilane, γ-aminopropylmethyldiethoxysilane, γ-aminopropylmethyldimethoxysilane, N-β-(aminoethyl)-γ-aminopropylmethyldimethoxysilane, N-β-(aminoethyl)-γ-aminopropylmethyldiethoxysilane, γ-glycidyloxypropylmethyldimethoxysilane, γ-glycidyloxypropylmethyldiethoxysilane, γ-methacryloxypropylmethyldimethoxysilane, methyldimethoxysilane, methyldiethoxysilane, dimethyldimethoxysilane, dimethyldiethoxysilane, methylvinyldimethoxysilane, methylvinyldiethoxysilane, diphenyldimethoxysilane, diphenyldiethoxysilane, 3,3,3-trifluoropropylmethyldimethoxysilane, 3,3,4,4,5,5,6,6,7,7,8,8-tridecafluorooctylmethyldimethoxysilane and 3,3,4,4,5,5,6,6,7,7,8,8,9,9,10,10,10-heptadecafluorodecylmethyldimethoxysilane; and tri- or tetra-alkoxysilanes such as γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane,
γ-mercaptopropyltrimethoxysilane,
γ-glycidyloxypropyltrimethoxysilane,
γ-glycidyloxypropyltriethoxysilane,
γ-methacryloxypropyltrimethoxysilane,
γ-chloropropyltrimethoxysilane, methyltriethoxysilane, phenyltrimethoxysilane, phenyltriethoxysilane, 3,3,3-trifluoropropyltrimethoxysilane, 3,3,4,4,5,5,6,6,7,7,8,8,8-tridecafluorooctyltrimethoxysilane, 3,3,4,4,5,5,6,6,7,7,8,8,9,9,10,10,10-heptadecafluorodecyltrimethoxysilane, tetramethoxysilane and tetraethoxysilane.

As particularly preferred ones which improve the adhesiveness to the polyurethane resin layer without impairing the transparency of the antireflection layer C, the following may be mentioned:

γ-aminopropyltriethoxysilane,
γ-aminopropylmethyldiethoxysilane,
γ-aminopropyltrimethoxysilane,
γ-aminopropylmethyldimethoxysilane, N-β-(aminoethyl)-γ-aminopropyltrimethoxysilane, N-β-(aminoethyl)-γ-aminopropylmethyldimethoxysilane, N-β-(aminoethyl)-γ-aminopropyltriethoxysilane and N-β-(aminoethyl)-γ-aminopropylmethyldiethoxysilane;
γ-glycidyloxypropyltrimethoxysilane,
γ-glycidyloxypropylmethyldimethoxysilane,
γ-glycidyloxypropyltriethoxysilane and γ-glycidyloxypropylmethyldiethoxysilane, having an epoxy group.

The thickness of the antireflection layer C is from 10 to 500 nm, preferably from 30 to 300 nm, more preferably from 50 to 200 nm, in order to obtain an adequate antireflection effect.

The method of forming the antireflection layer C is not particularly limited, but dip coating, roll coating, spray coating, gravure coating, comma coating, die coating or spin coating may, for example, be selected. It is preferred to employ spin coating with which a uniform thin coating film can be formed. The surface of the antireflection layer C as an outermost layer may be coated with a lubricant to impart abrasion resistance within a range of not impairing the antireflection property, or a lubricant may be incorporated in the antireflection layer C. Such a lubricant may be a perfluoropolyether such as Krytox, tradename, manufactured by DuPont Inc., DEMNUM, tradename, manufactured by Daikin Industries, Ltd., DAIFLOIL, tradename, manufactured by Daikin Industries, Ltd., Fomblin, tradename, manufactured by Ausimont Inc., or FLONLUBE, tradename, manufactured by Asahi Glass Company, Limited.

Method of Producing an Optical Film

The optical film 1 according to the present embodiment may be formed in such a manner that the layers A to C are sequentially laminated on a transparent substrate to obtain the optical film 1 integrated with the transparent substrate, or the layers A to C are sequentially laminated on a suitable substrate, preferably a substrate with releasing surface, then the optical film 1 comprising the layers A to C is separated from the substrate with releasing surface. Otherwise, at least one of the layers A to C is formed separately, and then the layers A to C are sequentially laminated by means of an adhesive or by direct heat sealing to form the optical film 1. Needless to say, an optical film comprising two layers of the color tone correcting layer A and the transparent resin layer B can be produced in the same method as the above method. As one example of the production method, a production example of the optical film 1 integrated with the transparent substrate will be described below.

As the transparent substrate, a suitable transparent substrate may be selected, depending upon the purpose of use of the optical film 1, from various transparent substrates of glass, polyesters such as polyethylene terephthalate (PET) and polybutylene terephthalate, polyacrylates such as polymethyl methacrylate (PMMA), polycarbonate (PC), polystyrene, a triacetate film, polyvinyl alcohol, polyvinyl chloride, polyvinylidene chloride, polyethylene, ethylene-vinyl acetate copolymers, polyvinyl butyral, metal ion-crosslinked ethylene methacrylate copolymers, polyurethane and cellophane. A glass plate, PET, PC and PMMA are preferably mentioned. The thickness of the transparent substrate is suitably determined depending upon properties required (such as strength or light weight property) for the application of the filter to be obtained, but in a usual case, a film or a plate having a thickness of from 0.1 to 10 mm is obtained.

First, one side of the transparent substrate is coated with a coating liquid for formation of the color tone correcting layer A, i.e. a coating liquid obtained by dissolving a thermoplastic resin in a solvent and mixing a colorant therewith, followed by drying to form the color tone correcting layer A in a desired thickness. In the drying step, the coating is heated to a temperature at which the solvent can adequately be removed, but the drying is carried out at a temperature as low as possible so as to avoid deterioration of the colorant as far as possible.

Then, on the color tone correcting layer A, the transparent resin layer B is formed by reactive casting. For formation of the transparent resin layer B, reactive bulk casting may be employed by using reactive materials (a polyol liquid and a polyisocyanate liquid) containing substantially no solvent. The color tone correcting layer A is coated with a mixture of a polyol liquid with a polyisocyanate liquid in a desired coating thickness, followed by heating to react the polyol with the polyisocyanate.

Then, the transparent resin layer B is coated with a coating liquid containing a non-crystalline fluoropolymer, followed by drying to form the antireflection layer C. Here, prior to the formation of the antireflection layer C, an active energy ray treatment such as a corona discharge treatment or an ultraviolet ray treatment, or a primer treatment with e.g. a silane coupling agent, may be preliminarily applied to the surface of the transparent resin layer B so as to strengthen the adhesion between the transparent resin layer B and the low refractive index layer of a non-crystalline fluoropolymer.

The optical film 1 thus produced has an antireflection property, a near infrared ray absorption property, a self-healing property and scratch resistance, and can be used as a near infrared ray absorptive film bonded to a window material for architectural structures such as houses and buildings, or a window material for vehicles such as automobiles, trains and aircrafts, or used as a film for antireflection, near infrared ray absorption and color tone correction, bonded to a surface of an image display device such as a plasma display panel (PDP), a cathode ray tube (CRT), a visual display terminal (VDT) or a liquid crystal display (LCD). Further, as a constitutional material of an optical filter to be bonded to a display surface of an image display device, it may be bonded to the surface of a filter main body directly or in combination with another film-like optical article to constitute a filter for an image display device or a touch panel. The film-like optical article may, for example, be a polarizing film, a light diffusion film, a phase difference film, a Fresnel lens film, a prism lens film or a lenticular film.

Other Preferred Constructions:

(1) Lubricating Treatment of the Antireflection Layer:

The surface of the antireflection layer C as an outermost layer may be coated with a lubricant to impart abrasion resistance within a range of not impairing the antireflection property, or a lubricant may be incorporated in the antireflection layer C. Such a lubricant may, for example, be a perfluoropolyether such as Krytox, tradename, manufactured by DuPont Inc., DAIFLOIL, tradename, manufactured by Daikin Industries, Ltd., Fomblin, tradename, manufactured by Ausimont Inc., or FLONLUBE, tradename, manufactured by Asahi Glass Company, Limited.

(2) Interlayer:

The antireflection layer C may have a single layer structure, or may have a multilayer structure combined with an interlayer made of a high refractive index material. When an interlayer having a refractive index higher than the refractive index of the transparent resin layer B is provided between the antireflection layer C and the transparent resin layer B, more excellent antireflection effect can be obtained. The refractive index of the transparent resin layer B is preferably from 1.45 to 1.55. The refractive index of the antireflection layer C is preferably at most 1.36. The difference in refractive index between the transparent resin layer B and the antireflection layer C is preferably from 0.09 to 0.19. The refractive index of the interlayer formed between the transparent resin layer B and the antireflection layer C is preferably from 1.55 to 1.65. The difference in refractive index between the interlayer and the antireflection layer C is preferably from 0.19 to 0.29. The difference in refractive index between the interlayer and the transparent resin layer B is preferably from 0.1 to 0.3, more preferably from 0.15 to 0.2. The thickness of the interlayer is preferably from 50 to 500 nm.

The interlayer is preferably a layer made of a resin having a refractive index higher than the refractive index of the transparent resin layer B, a layer made of a metal oxide having a refractive index higher than the refractive index of the transparent resin layer B, or a resin layer containing a metal oxide having a refractive index higher than the refractive index of the transparent resin layer B.

The resin having a high refractive index is preferably a polymer having an aromatic ring on its main chain or side chains, such as polystyrene, poly(2-chlorostyrene), poly(2,6-dichlorostyrene), poly(2-bromostyrene), poly(2,6-dibromostyrene), polycarbonate, aromatic polyester, polysulfone, polyethersulfone, polyarylsulfone, poly(pentabromophenylmethacrylate), a phenoxy resin or its brominated product, or an epoxy resin or its brominated product, or a polymer containing e.g. a bromine or sulfur element. Further, it is possible to increase the adhesive property to the transparent resin layer B or to the antireflection layer C, by modifying the terminal of such a resin with a reactive functional group. Among the above resins, e.g. a phenoxy resin and an epoxy resin have active functional groups at the terminals without modification, and they are preferred from the viewpoint of the adhesive property.

The metal oxide is particularly preferably a metal oxide having conductivity, which imparts an antistatic property to a transparent interlayer. In a case where the antistatic property is required, the metal oxide preferably has a resistivity of from $1 \times 10^{-7}$ to $1 \times 10^3$ Ω·m. Preferred metal oxides may, for example, be $Sb_2O_5$, $SnO_2$, $In_2O_3$, $TiO_2$, $RuO_2$, $Yb_2O_3$, $Ag_2O$, CuO, FeO and ITO, and among them, preferred are $Sb_2O_5$, $SnO_2$, $In_2O_3$ and ITO having favorable transparency and film forming property. Further, an antistatic layer made of a metal oxide and an oxide of an alloy of an metal such as Sb or Al, is also preferred, which further increases conductivity. Further, an inputting screen for touch panel capable of being input by a pressure by a pen or a finger may be formed on the transparent resin layer B by a transparent conductive material such as ITO.

It is also possible to incorporate the above-described resin having a high refractive index or the resin of the transparent resin layer B into a layer made of a metal oxide to improve the film forming property, or to incorporate a compound having a functional group which effectively functions for a chemical bonding such as an epoxy group, an amino group or a hydroxyl group into the layer in order to impart adhesion.

As a method of forming such an interlayer, it is preferred to coat the transparent resin layer B with an organic solvent solution of a resin having a refractive index higher than the refractive index of the transparent resin layer B in the same method as the coating in production of the antireflection layer C, whereby the film formation cost is low, the coating property is excellent, and the layer can be produced stably.

(3) Tackifying Process:

The optical film 1 of the present invention may be bonded to a window of an architectural structure or a window of a vehicle, a display screen of an image display device or the surface of a filter material, by providing a tackifier layer on the color tone correcting layer A in a case where the optical film 1 has such a construction shown in FIG. 1 that the color tone correcting layer A, the transparent resin layer B and the antireflection layer C are laminated, or on the transparent substrate in a case of such a construction that the color tone correcting layer A, the transparent resin layer B and the antireflection layer C are laminated on the transparent substrate. As the tackifier to be used for this purpose, a commercially available tackifier may be used, and preferred specific examples include tackifiers of acrylic ester copolymer type, polyvinyl chloride type, epoxy resin type, polyurethane type, vinyl acetate copolymer type, styrene-acrylic resin type, polyester type, polyamide type, polyolefin type, ethylene-vinyl acetate copolymer type, natural rubber type, styrene-butadiene rubber type, butyl rubber type, regenerated rubber type and silicone rubber type. Further, a release paper which can easily be separated may be bonded to the adhesive surface of the tackifier layer, whereby the optical film 1 has such a construction that it can be bonded to the surface of a desired substrate by peeling the release paper when the optical film 1 is used.

(4) Antistatic Treatment:

It is possible to incorporate a conductive material such as a metal oxide to impart an antistatic property as described in the above item (2) regarding the transparent interlayer, into the transparent resin layer B or the antireflection layer C to impart an antistatic function to the optical film 1 of the present invention. Preferred metal oxides may, for example, be $Sb_2O_5$, $SnO_2$, $In_2O_3$, $TiO_2$, $RuO_2$, $Yb_2O_3$, $Ag_2O$, CuO, FeO and ITO, and among them, particularly preferred are $Sb_2O_5$, $SnO_2$, $In_2O_3$ and ITO.

Now, the present invention will be described in further detail with reference to Examples. However, it should be understood that the present invention is by no means restricted to such specific Examples.

EXAMPLE 1

Formation of Color Tone Correcting Layer

A thermoplastic polyester type resin ("O-PET", tradename, manufactured by Kanebo Ltd.) having a glass transition temperature (Tg) of 142° C. was dissolved in a cyclopentanone/toluene (6/4) mixed solvent so that it became 15 mass %, to obtain a main component solution of a color tone correcting layer. Based on the resin component in the main component solution, 4 mass % of a diimmonium type colorant ("IRG-022", tradename, manufactured by Nippon Kayaku Co., Ltd.), 1 mass % of a phthalocyanine type colorant ("TX-EX-814K", tradename, manufactured by Nippon Shokubai Co., Ltd.), 0.9 mass % of a phthalocyanine type colorant ("IR-2", tradename, manufactured by Nippon Shokubai Co., Ltd.) and 0.1 mass % of an anthraquinone type colorant ("Blue", tradename, manufactured by Avecia Ltd.) were added and completely dissolved, and then a polyethylene terephthalate film having a thickness of 100 μm ("A4100", tradename, manufactured by Toyobo Co., Ltd.) was coated with the solution by gravure coating, followed by drying at a temperature of 120° C. for 5 minutes to obtain a film having a thickness of 106 μm, having near infrared ray absorption and color tone correcting functions.

Formation of Transparent Resin Layer

A transparent resin layer made of a polyurethane resin was prepared by the following method.

A blend composition as identified in Table 1 (Liquid A) was mixed with stirring at 80° C. for 3 hours to obtain a uniform liquid A.

A blend composition as identified in Table 1 (Liquid B) was mixed with stirring at 80° C. for 3 hours to obtain a uniform liquid B.

TABLE 1

| (Liquid A) | |
| --- | --- |
| Polycaprolactonetriol having a hydroxyl value of 196.4 | 78.2 parts by mass |
| Polycaprolactonetriol having a hydroxyl value of 540.3 | 19.6 parts by mass |
| Silicone type extender *1 | 0.5 part by mass |
| Antioxidant *2 | 0.5 part by mass |
| Ultraviolet ray absorbent *3 | 0.7 part by mass |
| Light stabilizer *4 | 0.5 part by mass |
| (Liquid B) | |
| Nurate-modified hexamethyleneisocyanate having a NCO content of 21.4% | 100 parts by mass |
| Dibutyltin dilaurate | 0.001 part by mass |

*1 "BYK-300", tradename, manufactured by Byk-Chemie
*2 "IRGANOX 1010" tradename, manufactured by Ciba Specialty Chemicals
*3 "TINUVIN328" tradename, manufactured by Ciba Specialty Chemicals
*4 "MARK LA-7H" tradename, manufactured by Asahi Denka Kogyo K. K.

These liquids A and B were mixed in a mass ratio of 40:60.

Then, the color tone correcting layer of the polyethylene terephthalate film having the color tone correcting layer formed thereon was coated with the above mixed liquid in a coating thickness of 200 μm by die coating, and the film was passed through an oven of 120° C. for 10 minutes to react the liquid A and the liquid B to form a transparent resin layer made of a polyurethane resin.

Formation of Antireflection Layer

Corona discharge treatment was applied to the surface of the transparent resin layer, then the surface was spin-coated with a solution having a brominated phenoxy resin dissolved in cyclohexanone in a concentration of 2 mass % to form an interlayer (refractive index n=1.60, film thickness: about 100 nm). The interlayer was spin-coated with a solution having a solution of a non-crystalline fluoropolymer (number average molecular weight: 50,000 to 80,000) (solution of CYTOP "CTL-805A", tradename, manufactured by Asahi Glass Company, Limited) diluted at 2 mass % with a solvent ("CT-SOLV180", tradename, manufactured by Asahi Glass Company, Limited), followed by heating at 140° C. for 10 minutes to form an antireflection layer having a thickness of about 100 nm (refractive index n=1.34), and an optical film having antireflection, color tone correcting and near infrared ray absorption functions was prepared.

EXAMPLE 2

An optical film was prepared in the same manner as in Example 1 except that in formation of a color tone correcting layer, an olefin type resin having a glass transition temperature of 171° C. ("ARTON", tradename, manufactured by JSR Corporation) was used instead of the thermoplastic polyester type resin.

COMPARATIVE EXAMPLE 1

An optical film was prepared in the same manner as in Example 1 except that in formation of a color tone correcting layer, a polyester type resin having a glass transition temperature of 80° C. ("Pesresin", tradename, manufactured by TAKAMATSU OIL & FAT CO., LTD.) was used instead of the thermoplastic polyester type resin.

COMPARATIVE EXAMPLE 2

An optical film was prepared in the same manner as in Example 1 except that in formation of a color tone correcting layer, a polystyrene butadiene polymer having a glass transition temperature of 37° C. ("LX407C5", tradename, manufactured by ZEON CORPORATION) was used instead of the thermoplastic polyester type resin.

COMPARATIVE EXAMPLE 3

A color tone correcting layer was formed on a polyethylene terephthalate film in the same manner as in Example 1 to prepare an optical film without formation of a transparent resin layer and an antireflection layer.

With regard to the optical films of Examples 1 and 2 and Comparative Examples 1 to 3, the near infrared ray (wavelength: 850 nm) transmittance, the visible light (380 to 780 nm) average transmittance, the reflectance and presence or absence of a self-healing property were examined. Test methods were as follows. The results are shown in Table 2.

TABLE 2

| | Resin having a self-healing property | Tg (° C.) of the main component of the color tone correcting layer | Ultraviolet ray absorption property | 850 nm transmittance (%) | 380–780 nm average transmittance (%) | Reflectance (%) | Self-healing property |
| --- | --- | --- | --- | --- | --- | --- | --- |
| Example 1 | Present | 142 | Present | 8 | 68 | 0.7 | Present |
| Example 2 | Present | 171 | Present | 8 | 68 | 0.7 | Present |
| Comparative Example 1 | Present | 80 | Present | 15 | 70 | 0.7 | Present |
| Comparative Example 2 | Present | 37 | Present | 20 | 75 | 0.7 | Present |
| Comparative Example 3 | Nil | 142 | Nil | 8 | 65 | 5.0 | Nil |

Near infrared Ray Transmittance (850 nm Transmittance)

The near infrared ray transmittance at a wavelength of 850 nm of the incident light from the antireflection layer side was measured by means of a spectrophotometer (VU-3100, manufactured by Shimadzu Corporation) in accordance with JIS K6714.

Visible Light Transmittance (380–780 nm Average Transmittance)

The average of values as measured by means of a spectrophotometer (UV-3100, manufactured by Shimadzu Corporation) at wavelengths of from 380 to 780 nm was taken. Here, the measurement of the transmittance was carried out in accordance with JIS K6714, and the transmittance of the incident light from the antireflection layer side was measured.

Reflectance (Reflection of Light Rays on One Side)

A test specimen having its non-measurement side coated with e.g. a black paint for delustering so as not to be affected with the reflection on said side, was used and the spectral reflectance factor was measured with a spectrophotometer UV-3100 manufactured by Shimadzu Corporation to calculate the reflectance in accordance with JIS Z8701 from the following formula:

$$Y = K \int_{380}^{780} S(\lambda) y(\lambda) R(\lambda) d\lambda$$

Y: Reflectance of light rays on one side
$S(\lambda)$: Distribution of standard light to be used for display of color
$y(\lambda)$: Color matching functions in XYZ display system
$R(\lambda)$: Spectral reflectance factor Self-Healing Property The maximum load (g) at which a self-healing property was secured, was measured by a HEIDON scratch tester employing a diamond chip having a tip diameter of 15 μm as a scratcher at 23° C. in a relative humidity of 50%. A case where the maximum load was at least 10 g was rated as the self-healing property "present", and the case where it is less than 10 g, is rated as "Nil".

Then, the optical films of Examples 1 and 2 and Comparative Examples 1 to 3 were subjected to:

(1) a moisture resistance test wherein each optical film was left to stand under high temperature and high humidity atmosphere at 60° C. in a relative humidity of 95% for 1,000 hours, and the 850 nm transmittance and the 380–780 nm average transmittance before and after the film was left to stand were measured to obtain the difference in transmittance between before and after the film was left to stand;

(2) a heat resistance test wherein each optical film was left to stand at a high temperature of 80° C. for 1,000 hours, and the 850 nm transmittance and the 380–780 nm average transmittance before and after the optical film was left to stand were measured to obtain the difference in transmittance between before and after the film was left to stand; and (3) a weather resistance test wherein each optical film was irradiated with 200 MJ/cm² of light from a xenon lamps and the 850 nm transmittance and the 380–780 nm average transmittance before and after the irradiation were measured to obtain the difference in transmittance between before and after the irradiation.

The results are shown in Table 3.

TABLE 3

|  | Moisture resistance (60° C., 95%, 1,000 hr) | | Heat resistance (80° C., 1,000 hr) | | Weather resistance after irradiation with Xenon 200 MJ | |
| --- | --- | --- | --- | --- | --- | --- |
|  | Difference in 850 nm transmittance | Difference in 380–780 nm average transmittance | Difference in 850 nm transmittance | Difference in 380–780 nm average transmittance | Difference in 850 nm transmittance | Difference in 380–780 nm average transmittance |
| Example 1 | At most 1% | At most 1% | At most 1% | At most 1% | At most 1% | At most 1% |
| Example 2 | At most 1% | At most 1% | At most 1% | At most 1% | At most 1% | At most 1% |
| Comparative Example 1 | At least 20% | At least 10% | At least 20% | At least 10% | At least 20% | At least 10% |
| Comparative Example 2 | At least 30% | At least 10% | At least 20% | At least 10% | At least 20% | At least 10% |
| Comparative Example 3 | At least 20% | At least 10% | At least 20% | At least 10% | At least 50% | At least 20% |

As evident from the results shown in Table 3, when the optical films of Examples 1 and 2 of the present invention were left to stand in a high humidity atmosphere at a high temperature for a long period of time, or even after they were irradiated with strong ultraviolet rays, favorable near infrared ray absorption property and visible light transmittance could be maintained. Accordingly, it was confirmed that an optical film excellent in durability and weather resistance can be obtained according to the present invention.

The optical film of the present invention has such a construction that a color tone correcting layer (A) containing as the main component a thermoplastic resin which is soluble in a solvent and which has a glass transition temperature of from 120 to 180° C., and containing a colorant which has a color tone correcting property, and a transparent resin layer (B) having a self-healing property and an ultraviolet ray absorption property, are laminated so that the transparent resin layer (B) is present on the viewer's side of the color tone correcting layer (A), whereby the transparent resin layer having weather resistance can protect the colorant in the color tone correcting layer. Accordingly, the durability and weather resistance of the optical film can be increased, and the color tone correcting property can be maintained even when the optical film is exposed to the outside for a long period of time. Therefore, according to the present invention, an optical film capable of being used in outdoor, to be exposed to the outside for a long period of time, can be provided.

By incorporating a colorant which has a near infrared ray absorption property into the color tone correcting layer (A), an effect as a noise protection filter for an electronic equipment can be imparted.

By using a transparent resin layer made of a material excellent in the self-healing property and scratch resistance, the transparent resin layer protects the color tone correcting layer as an underlayer against external force, and increases adhesive property and scratch resistance of the antireflection layer provided on the surface of the transparent resin layer as well, whereby permanent scratches are less likely to be formed on the surface of the film. Therefore, according to the present invention, an optical film which can be adequately applied to the surface of a window material or to the surface of a touch panel, for which scratch resistance is required, can be provided.

By providing an antireflection layer having a refractive index lower than that of the transparent resin layer on the surface of the transparent resin layer, when the optical film is applied to a display screen of an image display device, recognizability of images and contrast can be improved, and by adding a color tone correcting colorant as the case requires, a desired color tone can efficiently be obtained.

By laminating an antireflection layer and a color tone correcting layer having both color tone correcting property and near infrared ray absorption property on one film, production steps and procedure steps of a high quality optical film having these functions can be reduced, and such an optical film can be provided at a low cost.

By using a thermoplastic resin having a high glass transition temperature of from 120 to 180° C. as the main component of the color tone correcting layer, stability and heat resistance of the color tone correcting agent and the near infrared ray absorbent added to the layer improve. Therefore, according to the present invention, an optical film excellent in durability, with less deterioration of the color tone correcting property and near infrared ray absorption property can be provided.

By using a thermoplastic resin which is soluble in a solvent as the main component of the color tone correcting layer, the color tone correcting layer can be formed with a simple coating method, and thus the optical film can easily be produced, and the production cost can be reduced.

Further, by using a thermoplastic resin having a high glass transition temperature of from 120 to 180° C. as the main component of the color tone correcting layer, stability of the colorant improves, whereby combination of colorants which have not been conventionally incorporated in one layer, becomes possible, thus widening the degree of freedom of selection of colorants to be used, and accordingly the color tone can more strictly be corrected, and the variation in color tone correction can be increased.

The entire disclosure of Japanese Patent Application No. 2001-191633 filed on Jun. 25, 2001 including specification, claims, drawings and summary are incorporated herein by reference in its entirety.

What is claimed is:

1. An optical film which comprises a color tone correcting layer (A) containing as the main component a thermoplastic resin which is soluble in a solvent and which has a glass transition temperature of from 120 to 180° C., and containing a colorant which has a color tone correcting property, and a transparent resin layer (B) having a self-healing property and an ultraviolet ray absorption property, present on the viewer's side of the color tone correcting layer (A).

2. The optical film according to claim 1, wherein the color tone correcting layer (A) further contains a colorant which has a near infrared ray absorption property.

3. The optical film according to claim 2, wherein fine irregularities are present on the viewer's side surface of the transparent resin layer (B).

4. The optical film according to claim 1, wherein fine irregularities are present on the viewer's side surface of the transparent resin layer (B).

5. A transparent substrate comprising the optical film of claim 1 present on a substrate of the substrate, wherein the color tone correcting layer is directly adjacent to the transparent substrate.

6. A process for producing the optical film as defined in claim 1, which comprises laminating, on a transparent substrate or a substrate with a releasing surface, a color tone correcting layer (A) containing as the main component a thermoplastic resin which is soluble in a solvent and which has a glass transition temperature of from 120 to 180° C., and containing a colorant which has a color tone correcting property, and a transparent resin layer (B) having a self-healing property and an ultraviolet ray absorption property, in this order.

7. The process for producing the optical film according to claim 6, wherein the color tone correcting layer (A) further contains a colorant which has a near infrared ray absorption property.

8. An optical film which comprises a color tone correcting layer (A) containing as the main component a thermoplastic resin which is soluble in a solvent and which has a glass transition temperature of from 120 to 180° C., and containing a colorant which has a color tone correcting property, a transparent resin layer (B) having a self-healing property and an ultraviolet ray absorption property, present on the viewer's side of the color tone correcting layer (A), and an antireflection layer (C) present on the viewer's side of the transparent resin layer (B), wherein the antireflection layer (C) has a thickness of from 10 to 500 nm.

9. The optical film according to claim 8, wherein the color tone correcting layer (A) further contains a colorant which has a near infrared ray absorption property.

10. The optical film according to claim 9, wherein fine irregularities are present on the viewer's side surface of the transparent resin layer (B).

11. The optical film according to claim 10, wherein the antireflection layer (C) is made of a non-crystalline fluoropolymer.

12. The optical film according to claim 9, wherein the antireflection layer (C) is made of a non-crystalline fluoropolymer.

13. The optical film according to claim 8, wherein fine irregularities are present on the viewer's side surface of the transparent resin layer (B).

14. The optical film according to claim 13, wherein the antireflection layer (C) is made of a non-crystalline fluoropolymer.

15. The optical film according to claim 8, wherein the antireflection layer (C) is made of a non-crystalline fluoropolymer.

16. A process for producing the optical film as defined in claim 8, which comprises laminating, on a transparent substrate or a substrate with a releasing surface, a color tone correcting layer (A) containing as the main component a thermoplastic resin which is soluble in a solvent and which has a glass transition temperature of from 120 to 180° C., and containing a colorant which has a color tone correcting property, a transparent resin layer (B) having a self-healing property and an ultraviolet ray absorption property, and an antireflection layer (C), in this order.

17. The process for producing the optical film according to claim 16, wherein the color tone correcting layer (A) further contains a colorant which has a near infrared ray absorption property.

18. An optical film which comprises a color tone correcting layer (A) containing as the main component a thermoplastic resin which is soluble in a solvent and which has a glass transition temperature of from 120 to 180° C., and containing a colorant which has a color tone correcting property, a transparent resin layer (B) having a self-healing property and an ultraviolet ray absorption property, present on the viewer's side of the color tone correcting layer (A), an antireflection layer (C) present on the viewer's side of the transparent resin layer (B), and an interlayer having a refractive index higher than that of the transparent resin layer (B), present between the transparent resin layer (B) and the antireflection layer (C), wherein the antireflection layer (C) has a thickness of from 10 to 500 nm.

19. The optical film according to claim 18, wherein the color tone correcting layer (A) further contains a colorant which has a near infrared ray absorption property.

20. The optical film according to claim 19, wherein fine irregularities are present on the viewer's side surface of the transparent resin layer (B).

21. The optical film according to claim 20, wherein the antireflection layer (C) is made of a non-crystalline fluoropolymer.

22. The optical film according to claim 19, wherein the antireflection layer (C) is made of a non-crystalline fluoropolyrner.

23. The optical film according to claim 18, wherein fine irregularities are present on the viewers side surface of the transparent resin layer (B).

24. The optical film according to claim 23, wherein the antireflection layer (C) is made of a non-crystalline fluoropolymer.

25. The optical film according to claim 18, wherein the antireflection layer (C) is made of a non-crystalline fluoropolymer.

26. A process for producing the optical film as defined in claim 18, which comprises laminating, on a transparent substrate or a substrate with releasing surface, a color tone correcting layer (A) containing as the main component a thermoplastic resin which is soluble in a solvent and which has a glass transition temperature of from 120 to 180° C., and containing a colorant which has a color tone correcting property, a transparent resin layer (B) having a self-healing property and an ultraviolet ray absorption property, an interlayer having a refractive index higher than that of the transparent resin layer (B), and an antireflection layer (C), in this order.

27. The process for producing the optical film according to claim 26, wherein the color tone correcting layer (A) further contains a colorant which has a near infrared ray absorption property.

* * * * *